United States Patent
Arakawa et al.

(10) Patent No.: US 6,257,090 B1
(45) Date of Patent: Jul. 10, 2001

(54) AXLE HOUSING ASSEMBLY

(75) Inventors: Masayasu Arakawa; Mamoru Kuzuya; Hideaki Shima, all of Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/379,647

(22) Filed: Aug. 24, 1999

(30) Foreign Application Priority Data

Aug. 26, 1998 (JP) .................................................. 10-240375

(51) Int. Cl.⁷ .................................................. F16H 57/02
(52) U.S. Cl. .................................................. 74/607
(58) Field of Search .................................................. 74/607

(56) References Cited

U.S. PATENT DOCUMENTS

| | | | |
|---|---|---|---|
| 1,254,488 | * | 1/1918 | Ekern ..................... 74/607 |
| 1,544,614 | * | 7/1925 | Troke ..................... 74/607 |
| 1,569,664 | * | 1/1926 | Mogford ................. 74/607 |
| 1,903,146 | * | 3/1933 | Sterling .................. 74/607 |
| 1,934,854 | * | 11/1933 | Holmes ................... 74/607 |
| 2,557,937 | * | 6/1951 | Buckendale ............ 74/607 |
| 2,561,335 | * | 7/1951 | Buckendale ............ 74/607 |
| 2,570,191 | * | 10/1951 | Beckwith ............... 74/607 |
| 2,601,553 | * | 6/1952 | Nordenson ............. 74/607 |
| 2,776,019 | * | 1/1957 | Keese .................... 74/607 |
| 3,142,203 | * | 7/1964 | Bamford ................. 74/607 |
| 4,086,826 | * | 5/1978 | Von Kaler .............. 74/607 |
| 4,146,248 | * | 3/1979 | Chamberlain et al. . 74/607 |
| 4,234,120 | * | 11/1980 | Pringle ................... 74/607 |
| 4,391,351 | * | 7/1983 | Jirouset et al. ......... 74/607 |
| 4,611,505 | * | 9/1986 | Cronin et al. .......... 74/607 |
| 5,294,350 | * | 3/1994 | Murphy et al. ........ 74/607 |
| 5,297,447 | * | 3/1994 | Massaccesi ............ 74/607 |

FOREIGN PATENT DOCUMENTS

| | | |
|---|---|---|
| 59-79406 | 5/1984 | (JP) . |
| 5-169906 | 7/1993 | (JP) . |
| 2689819 | 8/1997 | (JP) . |

* cited by examiner

Primary Examiner—David A. Bucci
Assistant Examiner—Chong H. Kim
(74) Attorney, Agent, or Firm—Morgan & Finnegan, LLP

(57) ABSTRACT

An axle housing assembly has a stable strength against a drive repulsive force and is superior in dimensional precision and maintenance. The axle housing assembly for a vehicle includes: a differential housing for receiving a differential gear; a pair of axle tubes mounted integrally on the right and left sides of the differential housing for receiving respective drive axles; and an axle bracket mounted integrally on at least one of the axil tubes for receiving a repulsive force. In the axle housing assembly, the interconnection between the differential housing and the axle tube and the interconnection between the axle tube and the axle bracket for receiving the repulsive force are performed by bolts, respectfully.

5 Claims, 2 Drawing Sheets

AXLE HOUSING ASSEMBLY

BACKGROUND OF THE INVENTION

The present invention relates to an axle housing assembly for an industrial vehicle such as a forklift or the like.

DESCRIPTION OF THE RELATED ART

In a forklift, usually, front wheels are drive wheels, and a front axle for transmitting a drive force to the front wheels and a differential gear are received in the axle housing. Such an axle housing is conventionally, in general, composed of a differential housing for receiving a differential gear, and axle tubes coupled by welding, respectively, to the right and left opening portions of the differential housing for receiving a front axle.

Also, a type in which the axle housing is separated from an engine portion in order to suppress transmission of vibrations from the engine portion (including a transmission) becomes popular. In such a separation type axle housing, in order to resist the drive repulsive force generated during a starting operation, a braking operation or the like, a proximal portion of a ring portion of an axle bracket is fitted to be fixed to each of axle tubes by welding. The axle brackets are fixed to a base frame by bolts. (refer to the Japanese Patent No. 2,689,819)

As described above, in the conventional axle housing assembly, the integral formation is carried out by welding between the differential housing and the axle tubes and between the axle tubes and the axle brackets.

However, the welded portion is likely to receive an adverse affect such as a fatigue or the like by the drive repulsive force and there is a problem that non-uniformity in welding quality is likely to occur due to an ability of an individual welding worker.

Also, in the case where the axle housing assembly is assembled into the base frame, it is necessary to align through holes for bolt fastening formed in the axle brackets and the base frame, respectively, and a high dimensional precision is required. However, in the case where the differential housing, the axle tubes and axle brackets are integrally formed by welding, a welding strain or the like would occur. As a result, in order to ensure a desired dimensional precision, a high welding ability or technique is required. For this reason, the conventional axle housing assembly has been costly.

Furthermore, in the conventional structure, in the case where one of the structural components is broken down or damaged, it is difficult to replace the damaged component only. It is therefore necessary to replace the overall axle housing assembly, resulting in defects in maintenance property.

SUMMARY OF THE INVENTION

In view of the above-noted defects, an object of the present invention is to provide an axle housing assembly that has a stable strength against the drive repulsive force and is excellent in a dimensional precision and maintenance property in low cost.

In order to attain the above-mentioned object, according to the present invention, there is provided an axle housing assembly comprising a differential housing for receiving a differential gear, first and second axle tubes mounted integrally on both sides of the differential housing for receiving respective drive axles, a first axle bracket fixed to a frame of the vehicle and mounted on the first axle tube for receiving a repulsive force, first and second bolt means for fixing the first and second axle tubes, respectively, to the differential housing and a third bolt means for fixing the first axle bracket to the first axle tube.

In such a structure, since the coupling between the respective components may be performed by the bolt means, there is no problem that degradation in dimensional precision would occur due to the welding strain or the like. Also, in case of the bolt fastening, the product quality may be kept constant and the replacement of the components may be facilitated.

In the case where the repulsive force receiving axle bracket is fixed to the first axle tube by bolts, it is preferable that the bracket mounting portion is formed integrally with an outer circumferential surface of the axle tube, and the axle bracket for receiving the repulsive force is mounted on the bracket mounting portion by the bolt means without coupling with the first axle tube. In this case, it is possible to remove the axle bracket away from the axle tube simply by removing the bolt means without removing the overall axle housing assembly away from the base frame.

DESCRIPTION OF THE PREFERRED EMBODIMENTS

Figure 1:
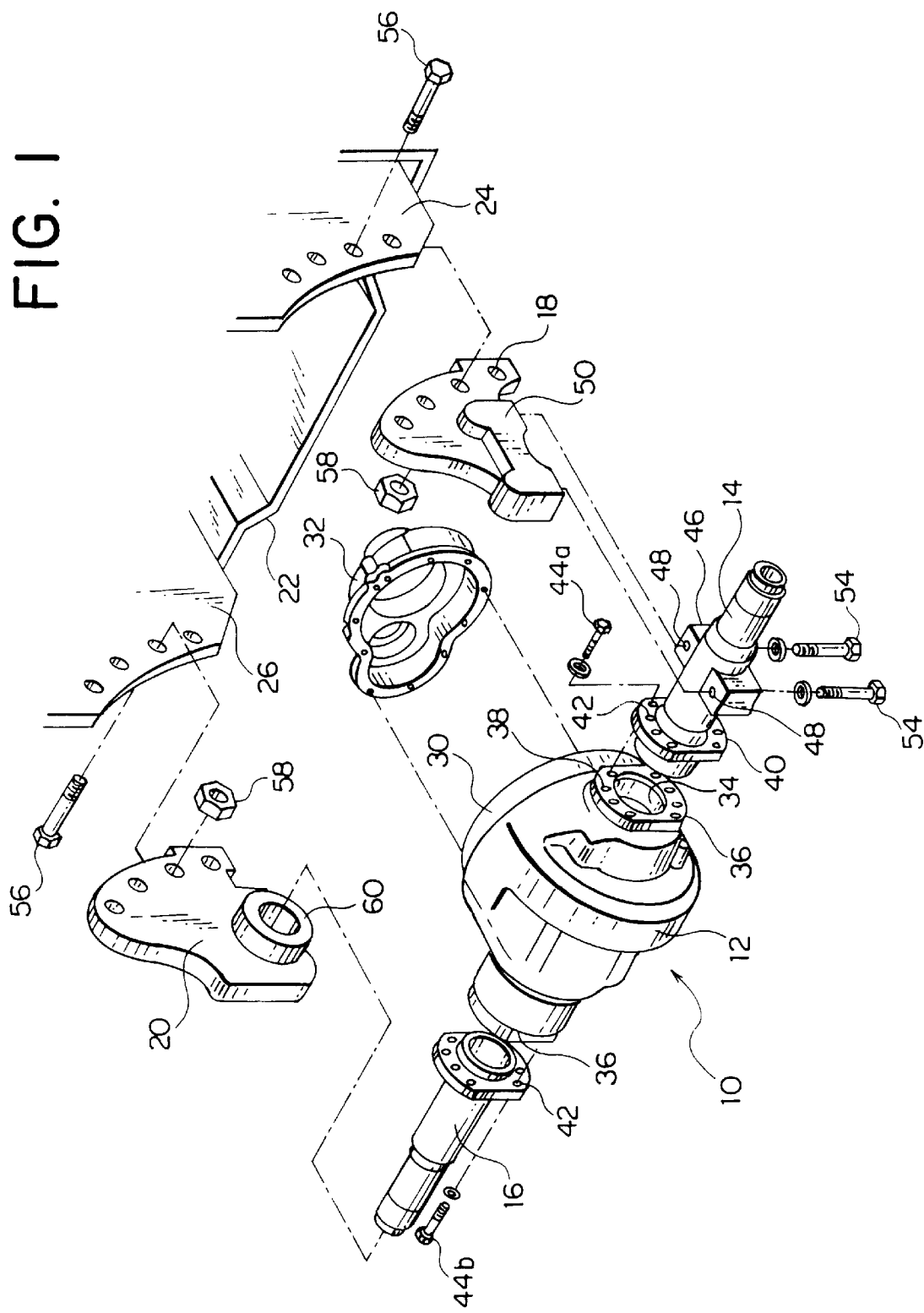
FIG. 1 is an exploded perspective view showing the embodiment of an axle housing assembly according to the present invention.
Figure 2:
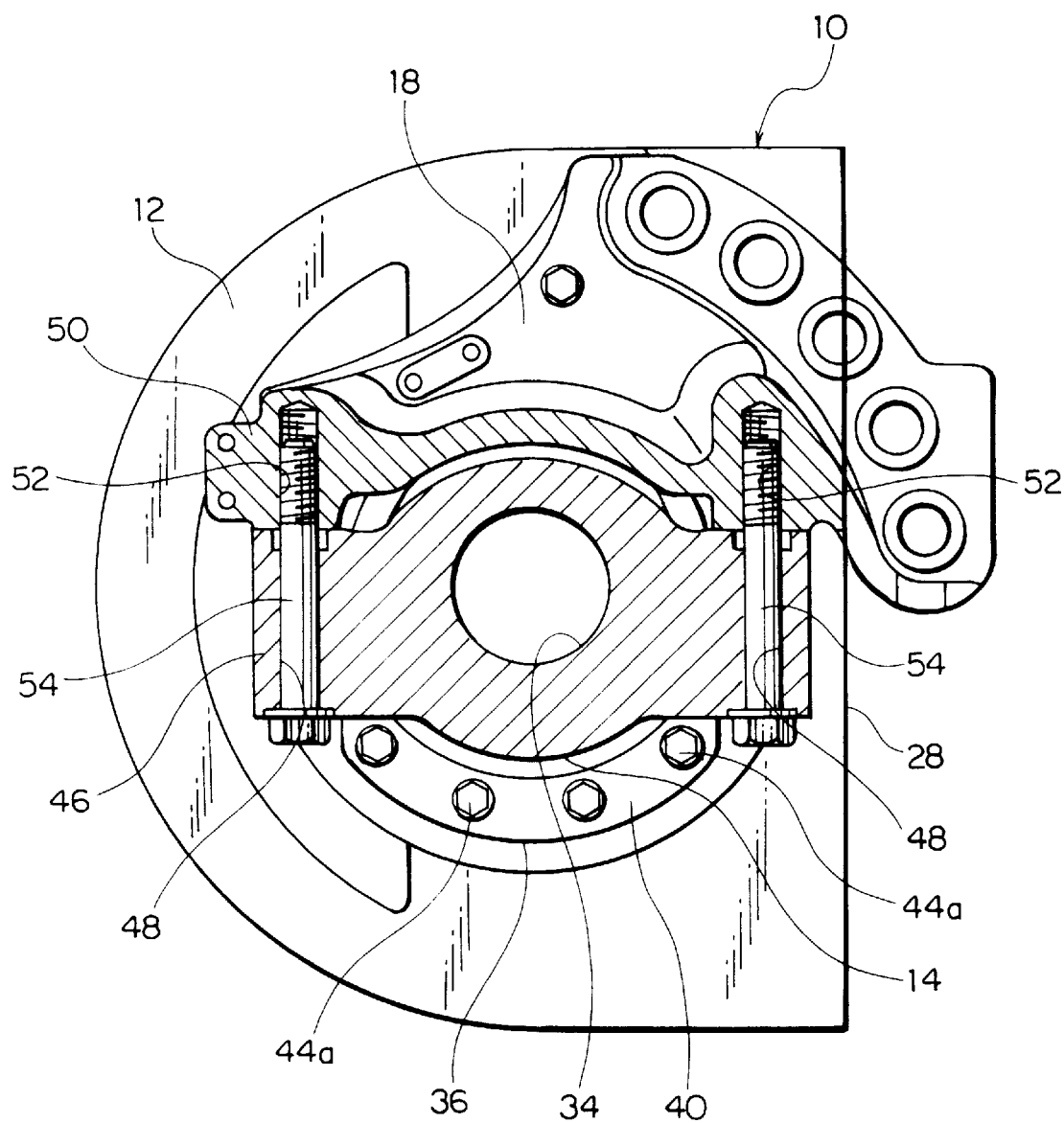
FIG. 2 is a vertical sectional view showing a main portion in the axle housing assembly shown in FIG. 1.

A preferred embodiment of the present invention will now be described in detail with reference to FIGS. 1 and 2. In a forklift structured in accordance with the present invention in conjunction with FIG. 1, an axle housing assembly 10 is provided with a differential housing 12 for receiving a differential gear (not shown) and axle tubes 14 and 16 extending on the right and left sides of this differential housing 12. The axle brackets 18 and 20 are mounted on the axle tubes 14 and 16 and fastened to side members 24 and 26 of a base frame 22 by bolts so that the axle housing assembly 10 is supported to the base frame 22. Also, in this embodiment, since the axle housing assembly 10 is of a type in which it is separated away from an engine portion (not shown), in order to resist a drive repulsive force, one axle bracket (axle bracket on the left side of the traveling direction of the vehicle in the embodiment shown) 18 is fixed to the axle tube 14.

A differential housing 12 has a central opening portion 28. A differential carrier 30 for supporting the differential gear and a carrier cover 32 are mounted at the central opening portion 28. Also, circular opening portions 34 are formed on the respective right and left side surfaces of the differential housing 12. A front axle (not shown) which is a drive axle connected to the differential gear within the differential housing 12 extends sideways from the opening portions 34. A boss 36 is formed around a circumferential edge of each opening portion 34. A plurality of screw holes 38 are formed in the boss 36 for coupling the axle tubes 14 and 16 as described later.

The front axles are coaxially disposed in the interior of axle tubes 14 and 16. The proximal end portions of the axle tubes 14 and 16 are fitted in the corresponding opening portions 34 in the differential housing 12 in a shrink fit manner. Flanges 40 project from the respective outer circumferential surfaces of the axle tubes 14 and 16 at positions away from the proximal ends at a predetermined distance. A plurality of through holes 42 corresponding to the screw holes 38 of the bosses 36 are formed in the flanges 40.

In the case where such axle tubes 14 and 16 are coupled with the differential housing 12, the respective proximal end portions of the axle tubes 14 and 16 are inserted into the corresponding opening portions 34 of the differential housing 12, the through holes 42 of the respective flanges 40 are aligned with the corresponding screw holes 38 of the bosses 36 and the axle tubes 14 and 16 are pressed to be inserted until the respective flanges 40 come into contact with the bosses 36. Then, the bolts 44*a* and the bolts 44*b* are caused to pass through the corresponding through holes 42 and to threadedly engage with the screw holes 38 so that the axle tubes 14 and 16 are fixed to the differential housing 12.

Also, a bracket mounting portion 46 is formed integrally with the outer circumferential surface of one axle tube 14 for mounting the axle bracket 18. The bracket mounting portion 46 has a portion extending forward of a vehicle and a portion extending rearward of the vehicle and these portions have through holes 48 which extend in the vertical direction.

The axle bracket 18 for receiving the repulsive force to be mounted on this bracket mounting portion 46 has a thick portion 50 to be disposed on the upper surface of the bracket mounting portion 46. As best shown in FIG. 2, screw holes 52 extending from the lower surface of the thick portion 50 upwardly are formed in the thick portion 50. These screw holes 52 are aligned with the through holes 48 under the condition that the axle bracket 18 is suitably disposed to the bracket mounting portion 46. Accordingly, the bolts 54 are caused to pass through the through holes 48 from below and fastened to the screw holes 52 so that the axle bracket 18 is fixed to the axle tube 14 and the differential housing 12, the axle tubes 14 and 16 and the axle bracket 18 form an integral structure. On the other hand, as is understood from FIG. 1, an arcuate circumferential edge portion of the axle bracket 18 is overlapped with a front edge portion of the side member 24 of the base frame 22 and fixed in place by a plurality of bolts 56 and nuts 58.

The axle housing assembly 10 is mainly subjected to the repulsive force in the rotational direction about the front axle at the time of start or brake. However, as described above, since the axle bracket 18 fixed to the base frame 22 is fixed integrally with the axle tube 14 by bolts 54, it is possible to sufficiently receive the above-described repulsive force at this portion.

Incidentally, the other axle bracket 20 is of a conventionally well-known type having a ring portion 60 rotatably engaged with the axle tube 16 for supporting the axle tube 16.

In the axle housing assembly 10 having the above-described structure, the interconnection between the differential housing 12 and the axle tubes 14 and 16 and the interconnection between the axle tube 14 and the axle bracket 18 for receiving the reactive force are assembled by coupling by the bolts 44*a*, 44*b* and 54, respectively. Accordingly, the welding work may be dispensed with when the axle housing assembly 10 is manufactured. Accordingly, it is possible to ensure the quality of the products at substantially the same level irrespective of the worker. Also, since there is no welding strain or the like between the components, the dimensional precision of the completed axle housing assembly 10 as a whole is high. Accordingly, it is possible to readily assemble the axle housing assembly 10 into the base frame 22.

Also, due to the coupling by bolts, it is easy to individually dismount the differential housing 12, the axle tubes 14 and 16 and the axle brackets 18 and 20. The maintenance property such as a replacement may therefore be kept well. In particular, in the embodiment shown, since the axle bracket 18 is not of a type which is engaged with the axle tube 14, it is unnecessary to insert and remove it along the axis of the axle tube 14 in attachment or detachment. For example, in the case where the axle brackets 18 are to be replaced, if the bolts 54 and the bolt/nuts 56 and 58 are removed, it is possible to remove the axle bracket 18 only and it is unnecessary to remove the axle housing assembly 10 as a whole away from the base frame 22.

As described above, the preferred embodiment of the present invention has been explained in detail. It is to be understood that the present invention is not limited thereto or thereby. For example, in the above-described embodiment, only one of the axle brackets is fixed to the axle tube and the other axle bracket is rotatable relative to the axle tube. However, it is possible to take a structure in which the other axle bracket is fixed to be unrotatable relative to the axle tube by bolts. Also, the present invention may be applied to industrial vehicles other than the forklift, for example, a shovel loader or the like.

As described above, the axle housing assembly according to the present invention takes a structure for performing the interconnections between the respective components by bolts. It is therefore possible to manufacture the products with ease and in a less costly manner. After the completion of the products, it is possible to obtain the product quality which is stable with high dimensional precision. This contributes to the prevention of the non-uniformity of the vehicle performance.

Also, since the dismounting is easy, it is sufficient only to replace the components to be displaced. The maintenance property is enhanced considerably in comparison with that of the prior art.

What is claimed is:

1. An axle housing assembly for a vehicle, comprising:
   a differential housing for receiving a differential gear;
   first and second axle tubes mounted integrally on both sides of said differential housing for receiving respective drive axles, said first axle tube having a bracket mounting portion projecting forward of the vehicle from said first axle tube and a portion projecting rearward of the vehicle from said first axle tube, said bracket mounting portions projecting forward and rearward having a bole extending from the lower surface of the bracket mounting portion to the upper surface of the bracket mounting portion;
   a first axle bracket mounted on said bracket mounting portion of said first axle tube for receiving a repulsive force;
   first and second bolt means for fixing said first and second axle tubes, respectively, to said differential housing; and
   a third bolt means caused to pass through said hole in said bracket mounting portion for fixing said first axle bracket to said bracket mounting portion.

2. The axle housing assembly according to claim 1, wherein the bracket mounting portion is formed integrally with an outer circumferential surface of said first axle tube, said first axle bracket being fixed to said bracket mounting portion without engaging with said axle tube.

3. The axle housing assembly according to claim 2, wherein said third bolt means is composed of two bolts passing through two holes in said bracket mounting portion, the two holes through which said respective bolts are caused to pass being formed in the bracket mounting portions projecting forward and the bracket mounting portion projecting rearward, respectively, and wherein said first axle bracket has screw holes which threadedly engage with said bolts.

4. The axle housing assembly according to claim 1, further comprising a second axle bracket rotatably engaged with said second axle tube.

5. An axle housing assembly for a vehicle, comprising:

a differential housing for receiving a differential gear;

first and second axle tubes mounted integrally on both sides of said differential housing for receiving respective drive axles;

a first axle bracket mounted on said first axle tube for receiving a repulsive force;

a second axle bracket rotatably engaged with said second axle tube;

first and second bolt means for fixing said first and second axle tubes, respectively, to said differential housing; and a third bolt means for fixing said first axle bracket to said first axle tube, wherein a bracket mounting portion for mounting said first axle bracket is formed integrally with an outer circumferential surface of said first axle tube, said first axle bracket being fixed to said first axle tube at said bracket mounting portion without being penetrated by said first axle tube.

wherein said bracket mounting portion has a portion projecting forward of the vehicle from said first axle tube and a portion projecting rearward of the vehicle from said first axle tube;

wherein said third bolt means is comprises of two bolts, through holes through which said respective bolts are caused to pass being formed in the portion projecting forward and the portion projecting rearward, respectively, and screw holes which threadedly engage with said bolts passing through said through holes extending from a lower surface of said first axle bracket upwardly in said first axle bracket.

* * * * *

UNITED STATES PATENT AND TRADEMARK OFFICE
CERTIFICATE OF CORRECTION

PATENT NO. : 6,257,090 B1
DATED : July 10, 2001
INVENTOR(S) : Masayasu Arakawa et al.

It is certified that error appears in the above-identified patent and that said Letters Patent is hereby corrected as shown below:

Column 4,
Line 49, please change "having a bole extending" to -- having a hole extending --;

Column 6,
Line 8, please change "first axle tube." to -- first axle tube, --;
Line 13, please change "third bolt means is comprises of two bolts" to -- third bolt means comprises two bolts --.

Signed and Sealed this

Twenty-third Day of April, 2002

Attest:

Attesting Officer

JAMES E. ROGAN
*Director of the United States Patent and Trademark Office*